United States Patent [19]

Dubail et al.

[11] Patent Number: 4,918,313

[45] Date of Patent: Apr. 17, 1990

[54] DEVICE FOR COUNTING PARTICLES OF IONIZING RADIATION AND ITS APPLICATION TO IMPLEMENTING A METHOD OF MEASURING THE RATE OF LEAKAGE BETWEEN THE PRIMARY AND SECONDARY CIRCUITS OF A STEAM GENERATOR

[75] Inventors: Alain Dubail, Clamart; Alain Pailhes, Lamanon Senas; Francis Schulcz, Eyguieres, all of France

[73] Assignee: Electricite de France (Service National), France

[21] Appl. No.: 71,025

[22] Filed: Jul. 8, 1987

[30] Foreign Application Priority Data

Jul. 10, 1986 [FR] France ................................ 86 10086

[51] Int. Cl.⁴ ............................................. G01T 1/167
[52] U.S. Cl. .................................. 250/356.2; 250/369
[58] Field of Search ............. 250/369, 252.1 R, 356.1, 250/356.2, 308, 261; 376/310, 217

[56] References Cited

U.S. PATENT DOCUMENTS 3,515,878  6/1970  Ried, Jr. et al. ..................... 250/369
4,272,677  6/1981  Berthold et al. .................... 250/369
4,339,663  7/1982  Brown ................................. 250/270
4,450,354  5/1984  Smith, Jr. et al. ................... 250/369

FOREIGN PATENT DOCUMENTS 1186921  4/1970  United Kingdom ............. 250/356.2

OTHER PUBLICATIONS

Feldstein et al "Total Stabilization of an Alpha Spectrometry System" Health Phys. vol. 36, 1/79, p. 60.
Fraser et al "Direct Current Stabiliz. of Scint. Count . . . " Nuclear Instru. & Methods 136, No. 3, Aug.-76, p. 513.
Article entitled "Total Stabilization of an Alpha Spectrometry System" by J. Feldstein et al from Health Physics, vol. 36, No. 1, Jan., 1979, pp. 59-60, Pergamon Press Ltd.
Article entitled "A Microprocessor Controlled Portable Neutron Spectrometer" by G. f. Hunt et al from IEEE Transactions on Nuclear Science, vol. NS-27, No. 1, Feb. 1980, pp. 757-762.
European Patent Application No. 85308306.1 (Filtrol Corporation), published on Aug. 6, 1986 as Publication No. 0 189 645.

Primary Examiner—Janice A. Howell
Assistant Examiner—Richard Hanig
Attorney, Agent, or Firm—Mason, Kolehmainen, Rathburn & Wyss

[57] ABSTRACT

A device for counting particles of ionizing radiation comprises a detector and a reference source on the input side of the detector delivering reference radiation the spectrum of which is situated outside the spectrum of the ionizing radiation to be detected. The device further comprises an arrangement for discriminating the amplitude and energy of the received ionizing radiation and means for adjusting the relative positions of the amplitude levels on a scale of amplitude and the amplitudes of the pulses generated by the reference radiation. The device may be applied to monitoring the flowrate of leakage between primary and secondary circuits of a nuclear power plant steam generator.

2 Claims, 7 Drawing Sheets

FIG_1a

FIG_1b

FIG_2

FIG_3

① GENERAL ORGANIZATION OF THE PROGRAM

FIG_4

FIG_5

② CONTROL INITIALIZATION

③ SEARCH OF SPECTRUM MAXIMUM

FIG_6

FIG_7a

FIG_7b

DEVICE FOR COUNTING PARTICLES OF IONIZING RADIATION AND ITS APPLICATION TO IMPLEMENTING A METHOD OF MEASURING THE RATE OF LEAKAGE BETWEEN THE PRIMARY AND SECONDARY CIRCUITS OF A STEAM GENERATOR

BACKGROUND OF THE INVENTION

1. Field of the Invention

The present invention concerns a device for counting particles of ionizing radiation and its application to implementing a method of measuring leakage between the primary and secondary circuits of a steam generator.

2. Description of the Prior Art

Devices for counting particles of ionizing radiation currently employed enable direct counting of ionizing particles, this counting being usually effected in the single case of counting a specific type of ionizing particle, actually a corresponding single energy level of these particles. However, in the case of particles emitted at high energy levels such as $\gamma$ photons with an energy greater than 4.5 MeV, detecting and in particular measuring the corresponding flowrate of the support radioactive effluent, especially in the case of low and very low flowrates, that is to say for a low emission intensity of the radioactive effluent, is usually made difficult by drift dependent on operating conditions and temperature in particular. Given the high sensitivity needed for measuring at low emission intensities, the effect of such unwanted drift is to falsify the measurement results and consequently render them useless for showing up and measuring low rates of leakage of radioactive effluent.

An object of the present invention is to remedy the aforementioned disadvantages through the implementation of a device for counting particles of ionizing radiation in which the effects of measurement drift are eliminated.

Another object of the present invention is the implementation of a device for counting particles of ionizing radiation in which energy level calibration is applied continuously so as to authorize the counting of pulses generated by particles of ionizing radiation, this calibration being relative to the energy level of particles of ionizing radiation from a so-called reference source.

Another object of the present invention is the implementation of a device for counting particles of ionizing radiation in which the energy spectrum of the reference ionizing radiation lies outside the energy spectrum of the ionizing radiation to be measured.

A further object of the present invention is the use of a device for counting particles of ionizing radiation to implement a method of detecting and measuring the rate of leakage between the primary and secondary circuits of a steam generator.

SUMMARY OF THE INVENTION

The invention consists in a device for counting particles of ionizing radiation of specified energy levels, comprising means for detecting said radiation adapted to deliver a detection signal in pulse form, on the input side of said detecting means a reference source adapted to deliver reference ionizing radiation the energy spectrum of which is situated outside the energy spectrum of said ionizing radiation, on the output side of said detecting means means for discriminating the amplitude of said detection signal against a scale of amplitude levels and for discriminating the energy spectrum of the received ionizing radiation which generated said pulses by counting the number of pulses of specified amplitude relative to the levels of the amplitude scale generated during a measurement time interval, and means for adjusting the relative position of the amplitude levels on the amplitude scale and the amplitude of the pulses generated by the reference ionizing radiation discriminated on the basis of the number of pulses of the same specified amplitude counted during the measurement time interval.

By virtue of the high degree of precision with which the previously described device can be calibrated, the invention finds an application in counting particles of ionizing radiation in an industrial environment in which operating conditions are particularly difficult.

Specifically, the device in accordance with the invention for counting particles of ionizing radiation may advantageously be employed to implement a method of detecting and measuring the rate of leakage between the primary and secondary circuits of a steam generator in nuclear power plant by detecting isotope 16 of nitrogen ($N^{16}$).

The invention will be better understood and other characteristics will emerge from the following description given with reference to the appended drawings.

BRIEF DESCRIPTION OF THE DRAWINGS

FIG. 2 shows a particularly advantageous embodiment of essential discrimination and counting means of the device in accordance with the invention as shown in FIG. 1a.

DESCRIPTION OF THE PREFERRED EMBODIMENTS

Figure 1A:
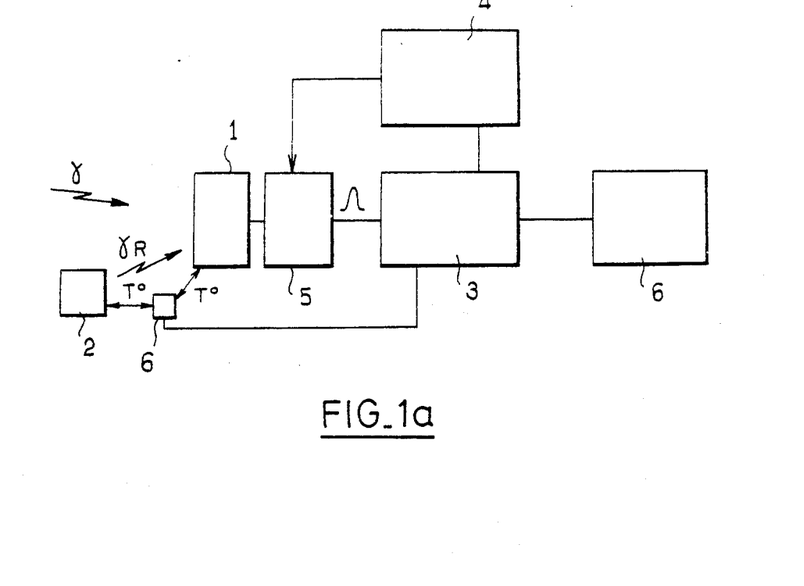
FIG. 1a is a block diagram of a device in accordance with the present invention for counting particles of ionizing radiation.

The device in accordance with the invention for counting particles of ionizing radiation will first be described with reference to FIG. 1a showing a block diagram of the device in accordance with the invention.

As shown in this figure, the device for counting particles of ionizing radiation of specified energy level comprises a radiation detector 1. The detector 1 delivers a detection signal in pulse form generated by the impact of the ionizing radiation particles.

Figure 1B:
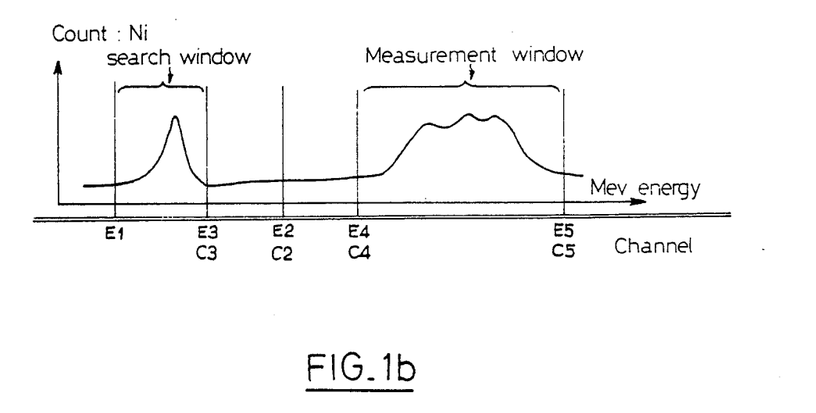
FIG. 1b is a diagram representing the spectra of the reference ionizing radiation produced by the reference source and the ionizing radiation to be detected or measured.

In accordance with the invention, the device further comprises on the input side of the detector 1 a reference source denoted 2 delivering reference ionizing radiation the energy spectrum of which is situated outside the energy spectrum of the ionizing radiation to be measured, as shown in FIG. 1b.

The particle counting device in accordance with the invention further comprises on the output side of the detector 1 a discriminator 3 for discriminating the amplitude of the detection signal with reference to a scale of amplitude levels denoted Ci in FIG. 1b and for discriminating the energy spectrum of the received ionizing radiation. In FIG. 1b the amplitude levels (channels) are denoted Ci and the energy spectrum of the received ionizing radiation consists in a representation on the vertical axis of the number Ni of pulses of specified amplitude relative to the levels Ci of the amplitude scale generated during a specific measurement time interval. The amplitude of the pulses of the detection signal is proportional to the energy of each particle of the received ionizing radiation. By "received ionizing radiation" is meant the reference ionizing radiation delivered by the reference source 2 or the ionizing radiation to be detected, or both. It is to be understood that the discrimination of the amplitude of the detection signal and the discrimination of the energy spectrum of the received ionizing radiation by counting the number of pulses of specified amplitude is effected during a specified measurement time interval.

As shown in FIG. 1a, the counting device in accordance with the invention further comprises means 4 for adjusting the relative position of the amplitude levels Ci on the amplitude scale and the amplitude of the pulses generated by the reference ionizing radiation, this reference radiation being, in accordance with the invention, discriminated on the basis of the number Ni of pulses of the same specified amplitude counted during the measurement time interval.

An advantageous embodiment of the discrimination and counting means of the device in accordance with the invention as shown in FIG. 1a will now be described with reference to FIG. 2.

As shown in this figure, the discriminator 3 for discriminating the amplitude of the detection signal and for discriminating the energy spectrum of the received ionizing radiation by counting the number of pulses of specified amplitude comprises, for example, an amplifier 30 for amplifying pulses delivered by the detector 1 and a peak detector 31 for detecting the peak amplitude of the amplified pulses delivered by the amplifier 30. The amplifier 30 for amplifying pulses delivered by the detector 1 may advantageously comprise amplifiers with a high input impedance whereby the current representing the detection signal as delivered by the detector 1 may be converted into a voltage representing the detection signal. The peak detector 31 for detecting the peak amplitude may comprise any conventional peak amplitude detector in which a capacitor network is charged to the peak value of the pulse. These conventional devices will not be described in detail. Furthermore, the discrimination and energy spectrum detection means 3 comprise sampling means denoted 32, 33 for sampling the pulses of the detection signal. The aforementioned sampling means deliver for each amplified pulse a digital signal representing the amplitude of the pulse.

Figure 2:
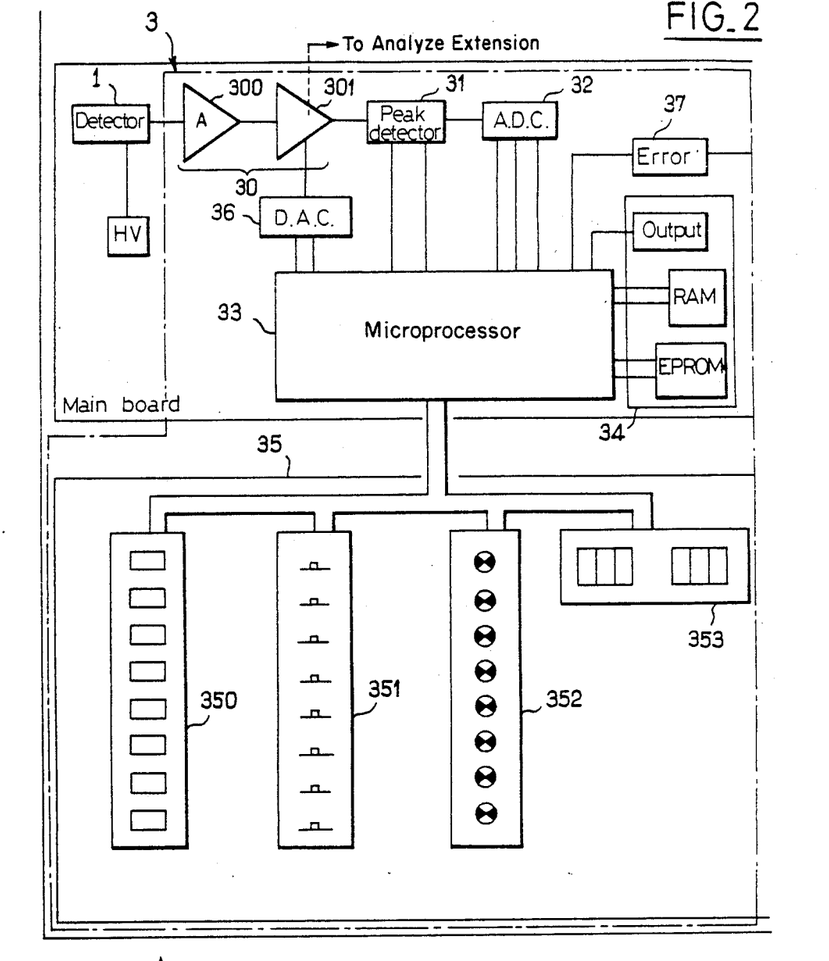

The means denoted 33, 34, 35 in FIG. 2 serve to compare the aforementioned digital signal with the level on the amplitude scale and to count the pulses, these means being associated with the levels on the amplitude scale. The aforementioned counting means are incremented during the measurement time interval for a positive result on comparing the corresponding value of the digital signal and the corresponding level on the scale of amplitude.

As seen in FIG. 2, the sampling means 32, 33 may advantageously comprise an analog-to-digital converter 32 controled by a microprocessor 33 with peripheral devices 34. By way of non-limiting example, the peripheral devices 34 may comprise random access memory, denoted RAM, and electrically programmable read-only memory, denoted EPROM. The comparison and counting means 33, 34, 35 advantageously comprise the microprocessor 33 and its peripheral devices 34, with which are associated input-output peripheral devices denoted 35 serving to encode amplitude scale levels Ci as shown in FIG. 1b and in particular to display calculated or measured device status parameters.

By way of non-limiting example, the input-output peripheral devices 35 may comprise encoding means 350 in the form of thumbwheel switches, for example, encoding means 351 in the form of pushbutton switches and indicator lamps denoted 352. An alphanumeric display system, denoted 353, may also be provided. The input-output peripheral devices 350, 351, 352, 253 are connected to the microprocessor 33 by a bus.

The parameters defining the energy levels of the reference ionizing radiation particles and of the particles of the ionizing radiation to be counted may advantageously be entered by means of the thumbwheel switches 350, these serving, for example, for entry of values such as E1 and E2, etc shown in FIG. 1b defining the search window or the range of energy levels in which the reference ionizing radiation or the particles thereof have to be looked for. Values such as E4 and E5 respectively corresponding to the minimal energy and the maximal energy of the particles of ionizing radiation to be counted may also be entered, these values defining the measurement window proper. It is to be understood that, in a non-limiting way, other energy values may be entered, for example the value E2 shown in FIG. 1b relating to the nominal energy level of the reference ionizing radiation.

The device for counting particles of ionizing radiation in accordance with the invention as shown in FIGS. 1a and 2 functions as will now be described, subject to the input of parameters relating to the search window and to the measurement window as shown in FIG. 1b. The detector 1 converts the photons or particles of ionizing radiation into pulses of charge and the amplifier 30 converts the pulses of charge into pulses of voltage constituting the detection signal. The means 31 for detecting the peak amplitude of the pulses constituting the detection signal send an interrupt request to the microprocessor 33 for each pulse of the detection signal exceeding the specified threshold, the peak value of the detection pulse then being memorized. The sampling mean consisting of the microprocessor 33 and the analog-to-digital converter 32 then serve to convert the previously mentioned memorized peak value into a binary number which, to give a non-limiting example, lies between 0 and 255. The energy spectrum of the received ionizing radiation relative to the reference ionizing radiation emitted by the reference source 2 is stabilized by adjusting the relative position of the amplitude levels Ci of the amplitude scale and the amplitudes of the pulses generated by the reference ionizing radiation. In accordance with the invention, the reference ionizing radiation is discriminated on the basis of the number Ni of pulses of the same specified amplitude corresponding to the energy level of the search window, as previously defined. The pulses are then counted for a specified measurement time interval.

The amplitude scale having been adjusted relative to the energy of the reference source pulses in this way, the pulses detected and then memorized by the sampling system may then be transmitted for processing the information for each γ photon situated in the measurement window the energy level of which corresponds to the energy level of the ionizing radiation to be counted.

In an advantageous embodiment of the device in accordance with the invention the counting means may comprise memory areas in the random access memory 34, denoted RAM in FIG. 2, associated with the microprocessor 33. In this case, a level on the amplitude scale corresponds, for example, to a specified memory area.

With a view to discriminating the energy spectrum of the received ionizing radiation and, in the final analysis, to discriminating the ionizing radiation from the reference source, the means for discriminating the energy spectrum of the received ionizing radiation may, to give a non-limiting example, comprise means for reading off from the counting means the number of pulses with amplitudes substantially equal to the various levels of the amplitude scale during a specified measurement time interval. Means for marking the relative maximum, denoted Nim, for the number Ni of pulses with an amplitude corresponding to each level Ci of the amplitude scale may also be provided. The maximum Nim for the number Ni of pulses corresponds to the pulses generated by the reference ionizing radiation 2. The aforementioned reading means and the means for marking the relative maximum Nim may advantageously comprise computer programs to be described later.

Figure 3:
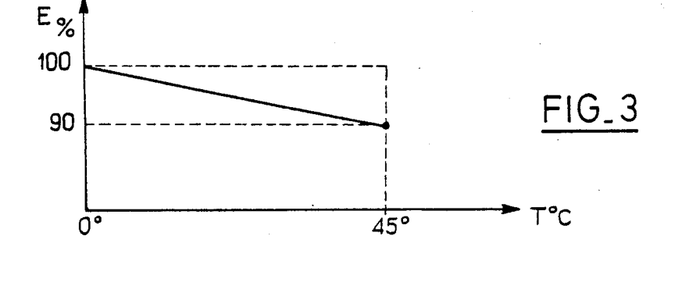
FIG. 3 shows the variation in the energy level of the reference ionizing radiation particles as a function of temperature.

A preferred but non-limiting embodiment of the device in accordance with the invention for counting particles of ionizing radiation will now be described with reference to FIGS. 2 and 3 in particular.

In the aforementioned FIG. 2 the means for adjusting the relative positions of the amplitude levels (or channels) Ci of the amplitude scale and the amplitudes of the pulses of the detection signal generated by and representative of the reference ionizing radiation comprise variable gain amplifier means. In FIG. 2 the aforementioned means, designated 5 in FIG. 1a, are inserted between the detector 1 and the means 3 for discriminating the amplitude and energy spectrum of the received ionizing radiation; as shown in the aforementioned FIG. 2, the variable gain amplifier 5 advantageously comprises an intermediary variable gain amplifier 301 directly integrated into the amplifier 30 for amplifying the pulses delivered by the previously described detector 1. The intermediary variable gain amplifier 301 may, for example, be controlled by the microprocessor 33 through the intermediary of a digital-to-analog converter, denoted 36, enabling direct control of the intermediary amplifier 301 for the purpose of adjusting or correcting its gain.

The reference source may advantageously contain isotope 241 of americium. The use of a source of this kind is not limiting, as it is normally possible to use any reference source that is compatible from the point of view of the relative energy spectra of the radiation from the reference source and the radiation to be measured. A source containing isotope 241 of americium essential produces radiation of α particles the characteristics of which are significantly different from the γ particles that can be detected but for which an equivalent energy in γ particles in the order of 2,500 keV can be defined with precision.

In the case of detecting particles of γ ionizing radiation the detector 1 may advantageously comprise a scintillation counter making it possible to change the frequency of the received radiation and, of course, the frequency of the reference radiation, followed by a photomultiplier responsive to the signal obtained by changing the frequency of the radiation. A preamplifier is normally provided to deliver the detection signal.

By virtue of an advantageous characteristic of the counting device in accordance with the invention a temperature probe denoted 6 in FIG. 1a may be provided in order to generate a signal representing the temperature of the scintillation counter and of the reference source with a view to compensating the efficiency with which radiation from the reference source is detected as a function of temperature. FIG. 3 shows the relative variation in the energy level of the particles of ionizing radiation emitted by the aforementioned reference source as a function of temperature. This figures shows a reduction of 10% in the energy level (and consequently in the amplitude of the pulses of the detection signal) for a variation in temperature between 0° and 45° C.

The functioning of the preferred embodiment of the device in accordance with the invention as previously described will now be described with reference to FIGS. 4 through 6 and FIGS. 7a, 7b which are flowcharts representing the software implanted in the peripheral devices, such as the peripheral devices 34 of the microprocessor 33. In particular, it will be understood that the means for reading the pulse counting means and the means for marking the relative maximum Nim advantageously comprise computer programs integrated into the aforementioned software.

Figure 4:
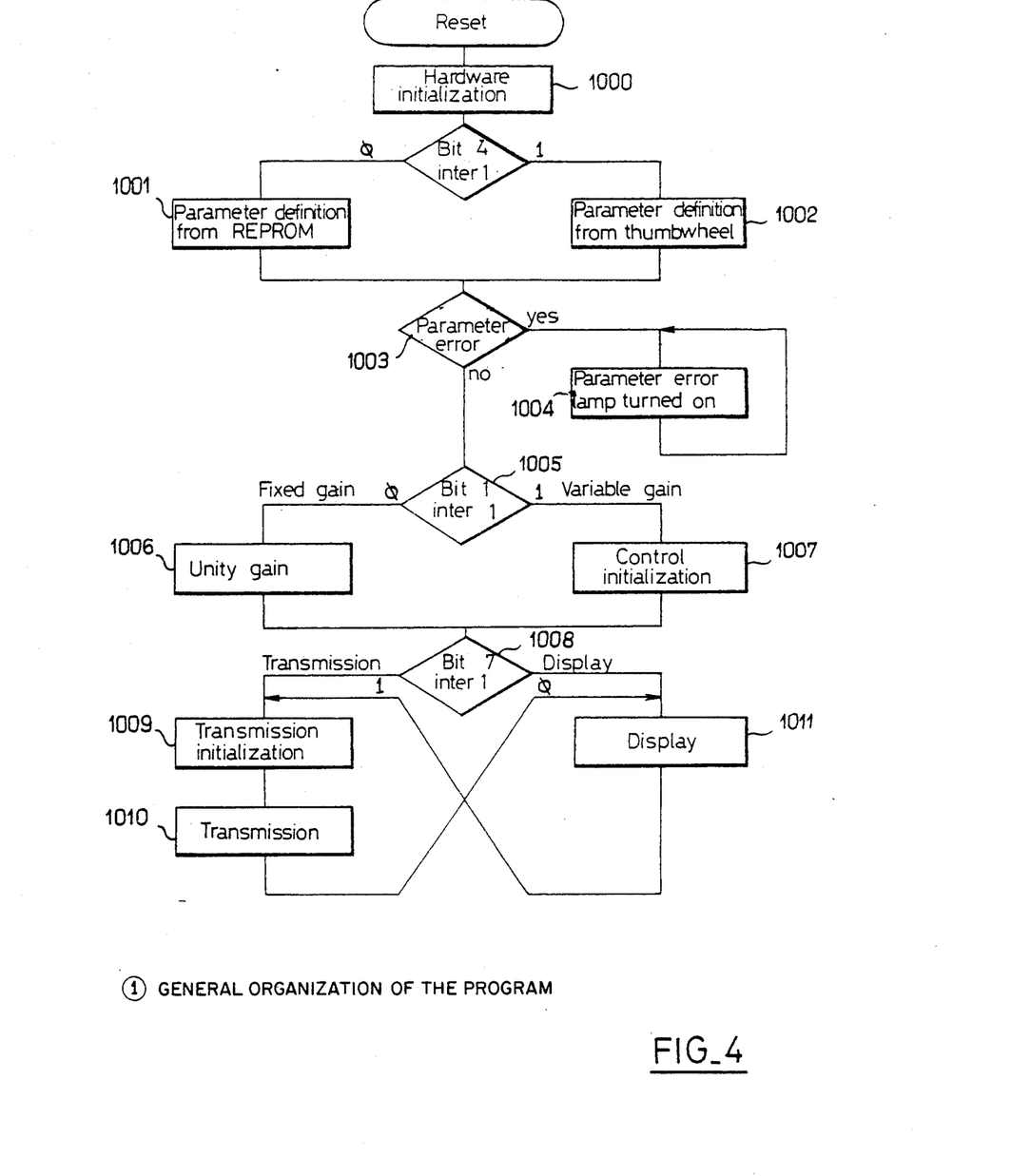
FIG. 4 shows a "menu" type program flowchart illustrating the general functioning of the device in accordance with the invention and how the equipment may be initialized.

With reference to FIG. 4, the general functioning of the device in accordance with the invention for counting particles of ionizing radiation is controled by a "menu" type program whereby the hardware is appropriately initialized and then a pulse is concurrently transmitted to the data processing system for each photon the energy level of which is inside the measurement window, the reception range of the received energy spectrum is stabilized relative to the reference source or an arbitrary gain determined so that the overall system gain is unity, and finally the display means 353 display the channel or energy level number of the amplitude range and the content in terms of the number of pulses of corresponding amplitude.

In FIG. 4, the starting up of the device in accordance with the invention for counting particles of ionizing radiation is followed by a hardware initialization phase, denoted 1000, followed by a test enabling the operator to choose input of energy parameters defining in particular the search window and the measurement window either from the REPROM read only memory 34 or from the thumbwheel switches denoted 350. Following input of the aforementioned parameters, the validity of the parameters is tested at 1003 and a lamp 352 is turned on in response to a parameter error at 1004. If there is no parameter error, the operating mode of the device in accordance with the invention is tested at 1005, the operating mode being operator selected as either with fixed gain as previously described or with variable gain, enabling adjustment of the relative positions of the amplitude levels on the amplitude scale relative to the energy level or corresponding amplitude of the reference radiation. A test 1008 then enables progress to the transmission phase proper 1010 as previously defined, following on from a transmission initialization phase 1009 and then a display phase denoted 1011 or vice versa. The hardware initialization phase proper essentially enables turning off of the lamps and displays 352, 353, with the possible exception of the turning on of an initialization lamp at 352 and the initialization of the output port or ports of the peripheral devices 34 enabling transmission to the processing system proper. Also, a programmable clock integrated into the microprocessor 33 serves to interrupt the microprocessor at fixed periods. This interrupt may be adjusted according to the frequency or intensity of the particles of ionizing radiation to be counted. The parameters input by means of the thumbwheel switches 350 or from the EPROM read only memory are converted into amplitude levels according to a specified proportionality coefficient. To give a non-limiting example, one elementary channel may correspond to an energy band of 50 keV. The hardware initialization phase may also serve for input of parameters such as the acquisition period for a peak value of a pulse constituting the detection signal. This period might vary between 5 and 40 seconds, depending on the application, for example. Another parameter that might be entered is the number of elementary measurement time intervals, essentially corresponding to two consecutive interrupts at the microprocessor 33, over which the offset between the real position of the maximum Nim for the number of pulses of the reference radiation is measured relative to the theoretical position of the latter. This number (B) makes it possible, for the same value of the previously mentioned offset or for the same direction of variation in this offset on the previously defined number of measurements B, to correct appropriately the relative position of the amplitude level of the detected signal corresponding to the reference radiation and of the amplitude range on the amplitude scale which is normally reserved to it.

Finally, the parameter validity test 1003 may consist in a test on the coherency of the energy values entered to define the search window and the measurement window, for example. The control initialization phase denoted 1007 in FIG. 4 will now be described with reference to FIG. 5.

Figure 5:
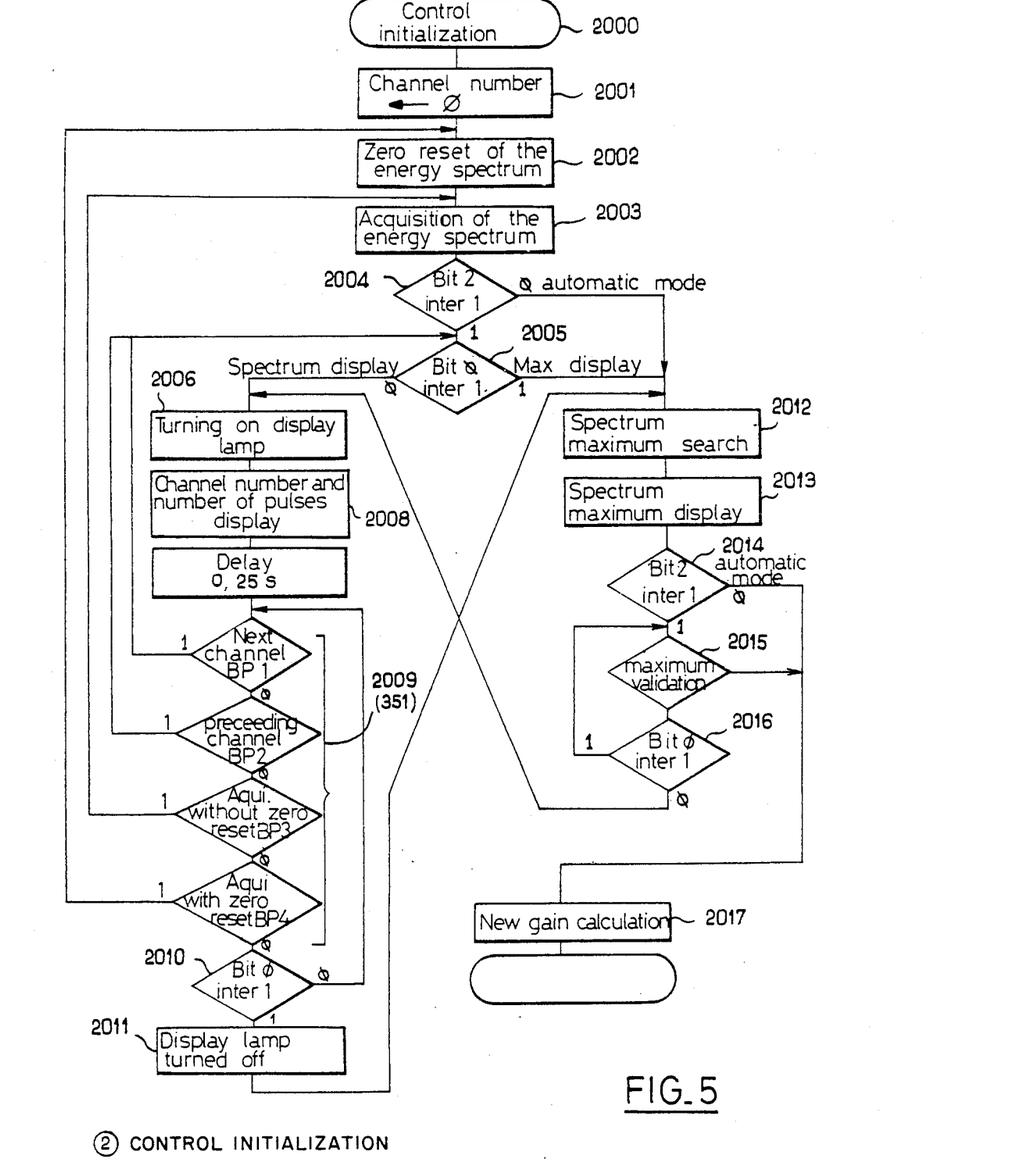
FIG. 5 shows the control initialization flowchart in the case where the adjustment means comprise a variable gain amplifier.

As shown in this figure, the control initialization phase beginning at 2000 comprises a definition of the channel number at 2001 followed by a resetting to zero of the memory area assigned to memorizing values representing the energy spectrum of the received ionizing radiation (2002) in turn followed by a phase for acquisition of the energy spectrum at 2003. A test at 2004 provides for operator choice between operation in manual mode and operation in automatic mode. In manual mode operation a test at 2005 enables a choice between display of values of the energy spectrum of the received ionizing radiation or display of the spectrum maximum, validation of this maximum by the user enabling calculation of the new gain. In automatic mode a phase of looking for the spectrum maximum (2012) is followed by a phase of displaying this maximum (2013), further functioning in automatic mode after a test 2014 enabling immediate calculation of the new gain at 2017. In manual mode functioning, following on from the test 2005 previously described or from the test 2014 after validation in a maximum validation test at 2015 and a validation presence test at 2016, a phase in which the spectrum proper is displayed is initiated. This phase comprises a phase 2006 for turning on a "DISPLAY" lamp 352 followed by display of the channel number and the number of pulses on the display means 353 at 2008. The user can then employ the pushbuttons 351 to display the various channels, that is to say the corresponding number of channels and the number of corresponding pulses, by pressing one of the pushbuttons to display the next channel and by pressing another pushbutton 352 to display the previous channel. The pushbuttons 351 thus serve as function buttons. In particular, these enable a new spectrum acquisition without resetting to zero the previously defined spectrum area, or alternatively acquisition with resetting to zero. A test (2010) on the status of the pushbuttons 352 makes it possible, after turning off the "display" lamp (2011), to return to the maximum display phase again.

Figure 6:
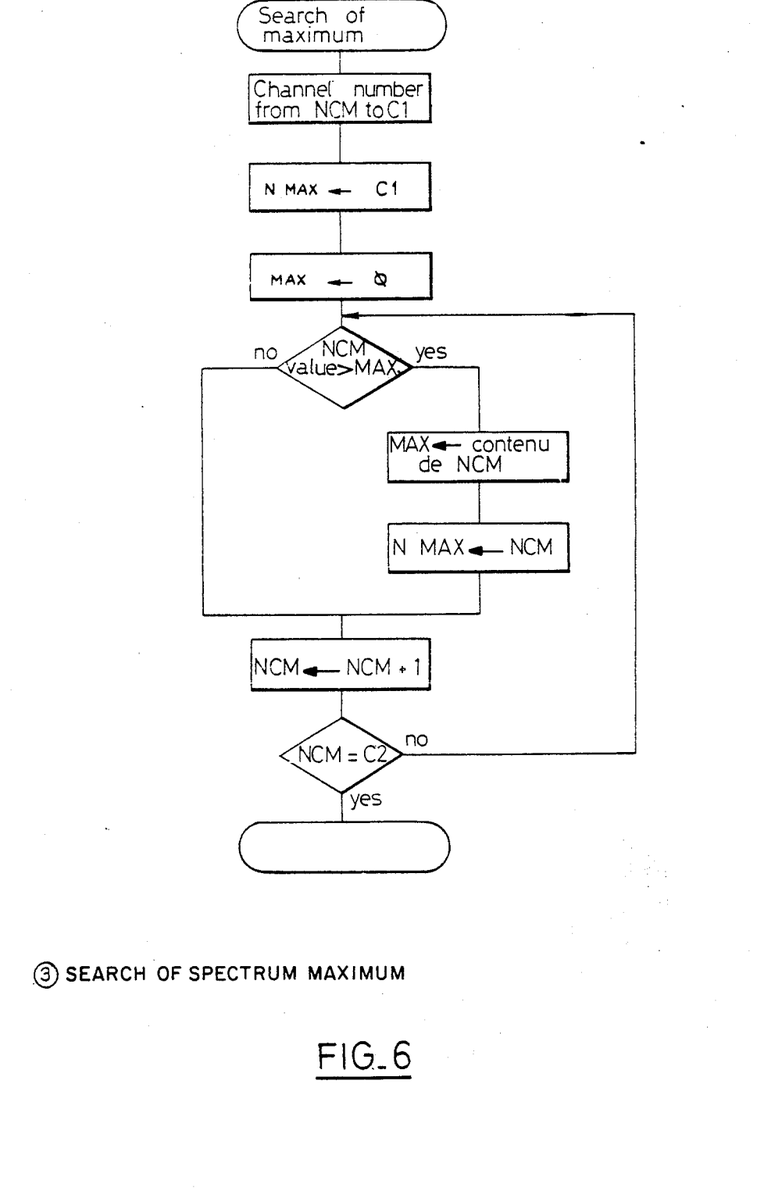
FIG. 6 shows a flowchart for determining the so-called relative maximum number of pulses of specified level for each amplitude level (channel) on the amplitudes scale.

The phase of looking for the spectrum maximum, denoted 2012 in FIG. 5, may, as shown in FIG. 6, consist of a program similar to a program for sorting a maximum value from a specified number of values, this number naturally corresponding to the number Ci of channels (amplitude levels) on the amplitude scale. This type of program will not be described in more detail, as it corresponds to algorithm structures that are conventional for this type of operation.

With regard to calculation of the gain, the offset between the number of the channel Ct in which the peak corresponding to the reference radiation should theoretically be found and the number of the channel Cm in which the peak corresponding to the reference radiation is actually found makes it possible to calculate the value to be supplied to the digital-to-analog converter 36 in order to move the reference radiation peak into the appropriate channel. For example, this digital value may verify a linear relation proportional to the ratio Ct/Cn for a linear definition of the one-to-one correspondence between the number Ci of channels or amplitude levels on the amplitude scale and the energy level of the particles of ionizing radiation in question.

The hardware initialization and control initialization phases respectively referenced 1000 and 1007 in FIG. 4 having been completed, the device in accordance with the invention then enables a change to transmission mode or display mode.

To give a non-limiting example, the transmission initialization phase 1009 may entail turning on a transmission lamp 352 and the display on the display means 353 of the digital value applied to the digital-to-analog converter 36, for example.

Figure 7A:
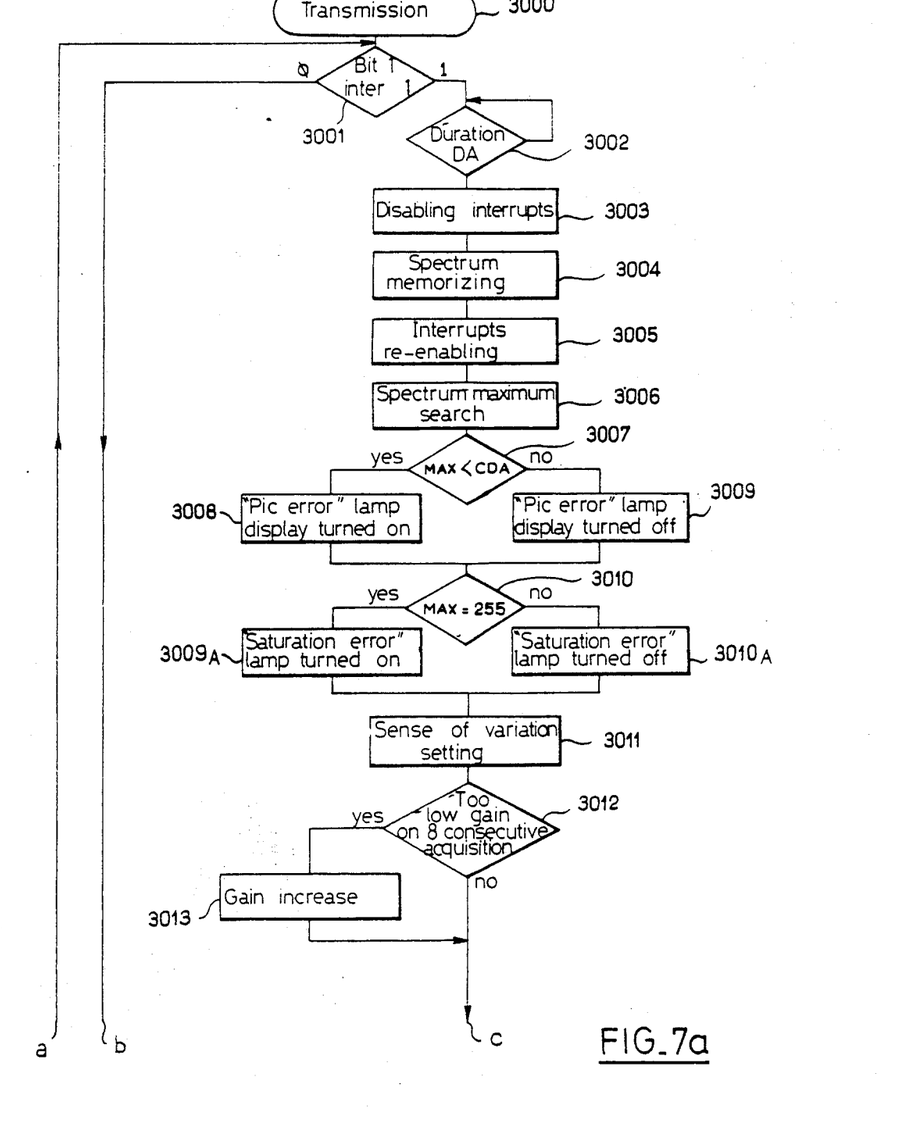
FIGS. 7a and 7b, which are complementary to each other, show a flowchart for transmission of information or operating status parameters from the device to input-output peripheral devices.
Figure 7B:
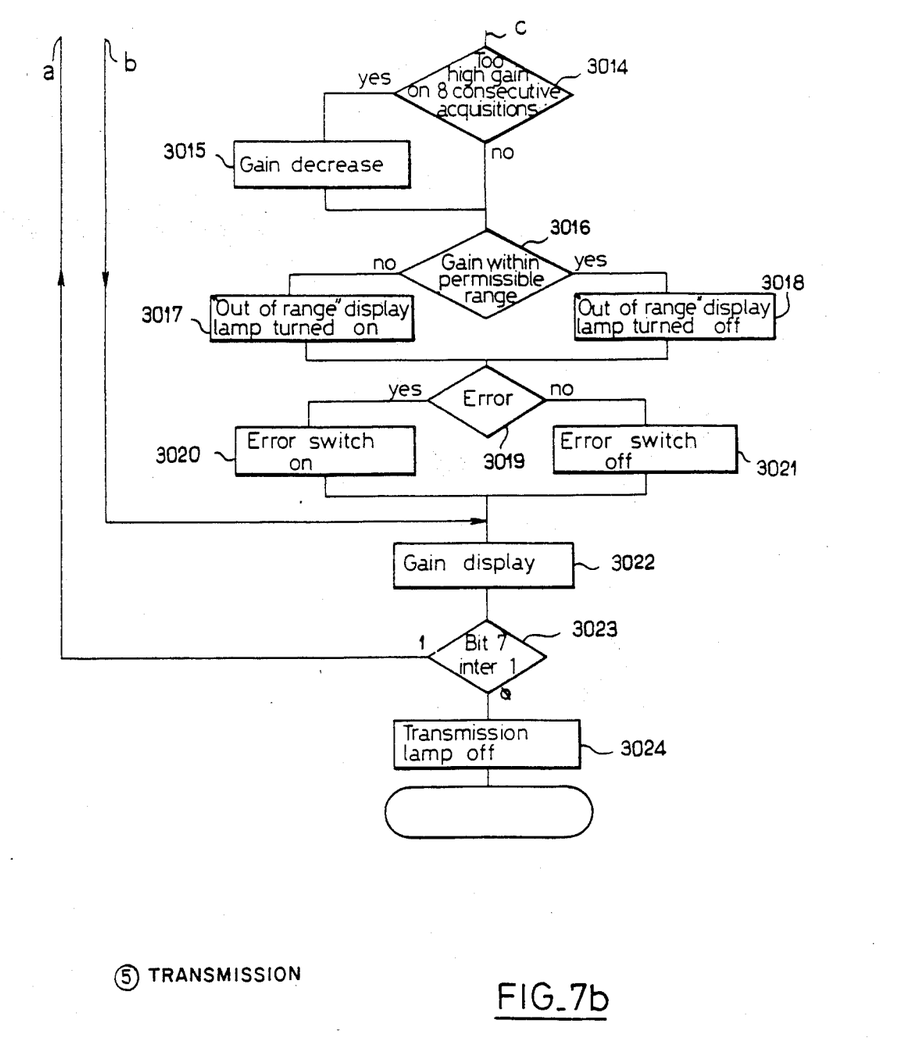

The so-called transmission phase proper will be described with reference to FIGS. 7a and 7b which are complementary to each other in the case of operation with variable gain, the functional status being determined by a test 3001.

When functioning with variable gain, the energy spectrum may be acquired in each specified duration period denoted DA at 3002 and then the maximum of the spectrum within the search window is looked for at 3006, after disabling interrupts at 3003, memorizing the spectrum at 3004 and re-enabling interrupts at 3005. The validity of the maximum determined relative to a value denoted CDA is tested at 3007 leading to the turning on of a "PEAK ERROR" lamp 352 at 3008 if the test result is negative and the turning off of this lamp (or leaving it turned off) at 3009 if the test result is positive. A saturation verification test is effected at 3010 to turn on or off (3009A or 3010A) a "SATURATION ERROR" lamp 352. In the two error situations (test 3007 and test 3010) transmission of the pulses to the processing circuits is suspended and an error switch denoted 37 in FIG. 2 is closed. If there is no error the position of the real maximum Cm is compared with the previously defined theoretical position Ct at 3011.

Tests 3012 and 3014 on B consecutive acquisitions then lead to incrementing of the gain at 3013 or decrementing of the gain at 3015, as appropriate. A new test 3016 is then applied to verify that the gain of the variable gain amplifier 301 is actually within the permissible range. The status of the aforementioned gain is indicated at 3017, 3018, the presence of a gain that is outside the range leading to suspension of transmission of pulses to the processing circuits by closing of the aforementioned error switch 37. Finally, in the absence of errors, the value applied to the digital-to-analog converter 37 is displayed at 3022 on the display means 353, a test 3023 providing for either a return to the transmission phase or, after the "TRANSMISSION" lamp is turned off at 3024, a change to display mode.

To give a non-limiting example, the display mode as previously mentioned may comprise a resetting to zero of the number of the channel (amplitude level) in question, followed by resetting to zero of the spectrum memorization area, followed by acquisition of the spectrum. The number of the channel in question is then displayed on the display means 353, together with the number of pulses in the channel in question, the number of pulses being displayed in packets comprising a specified number of pulses, for example. In the same way as for functioning in transmission mode, the pushbuttons 351 constituting function pushbuttons serve to select either the next channel or the previous channel and acquisition with or without resetting to zero.

The device in accordance with the invention for counting particles of ionizing radiation is extremely stable in terms of measurement accuracy by virtue of its characteristics as previously defined. In particular, the device in accordance with the invention may advantageously be used to implement a method of measuring in real time the leakage rate between the primary circuit and the secondary circuit of a steam generator.

When the device in accordance with the invention is used for this, it serves to detect at the exterior of a specified point on the secondary circuit a radioactive tracer contained in the primary circuit fluid. It is to be understood that in the case of a steam generator the radioactive tracer is isotope 16 of nitrogen ($N^{16}$) which is normally contained in the fluid circulating in the primary circuit of the generator.

The detection of particles of ionizing radiation emitted by isotope 16 of nitrogen then serves to trigger alarm systems or the like.

Because of the high degree of sensitivity and precision in the measurements that can be made using the device in accordance with the invention, it is also possible to calculate the leakage rate q between the primary circuit and the secondary circuit from the equation:

$$q = \frac{Q \cdot \rho p}{\rho p} \cdot k \cdot \frac{Av}{Av}$$

In this equation:

$\rho p$ represents the density of the primary fluid,

Ap represents the radioactive concentration of isotope 16 of nitrogen ($N^{16}$) of the primary fluid at the leak, Q represents the steam flowrate, $\rho v$ represents the density of the steam, Av represents the radioactive concentration of isotope 16 of nitrogen ($N^{16}$) in the steam at the measurement point, and k represents a coefficient characteristic of the decrease in the concentration of the tracer or radioactive element in the secondary circuit fluid.

The value of the aforementioned coefficient k depends in particular on the installation and on its constructional parameters.

The method of measuring primary-secondary leakage is based on detecting isotope 16 of nitrogen in the steam.

Nitrogen 16 is the main contaminating agent in the primary circuit. Formed by neutron activation of the oxygen in the water, its volumic activity in the primary circuit depends only on the neutron power of the reactor.

If the power is less than 5% of the nominal power it is not possible to measure leakage by detecting nitrogen 16, because of its excessively low level of activity in the primary circuit and the prohibitive transit time between the leak and the measuring point under these conditions of operation (the half-life of nitrogen 16 is 7.35 seconds).

There are other radioactive substances that can be detected under these operating conditions, however. If there is limited fuel jacket leakage the primary water is contaminated with radioactive gases resulting from the fission of uranium 235 (especially $^{87}Kr$ and $^{88}Kr$). The activity of these gases in the primary water is normally sufficient for detecting rapid development of leaks between the primary and secondary circuits when the reactor is operating at less than 5% of its nominal power. Such detection, in an energy band between 0.2 and 2.2 MeV, is facilitated by choosing a reference source ($^{241}Am$) whose pulse spectrum has no significant component in this energy band.

The changeover from "nitrogen 16" counting mode (at 4.5 to 7 MeV) to "fission gas" counting mode (at 0.2 to 2.2 MeV) is conditioned by a measurement signal representative of the reactor power as a proportion of its nominal power. This signal is also used to calculate the leakage flowrate in the "nitrogen 16" counting or operating mode.

We have now described a device for counting particles of ionizing radiation of specified energy level which, by virtue of the high degree of precision and stability in measuring/counting that can be achieved using it, makes it possible to define specific applications of very great benefit in an industrial environment and in particular under very difficult operating conditions, such as surveillance of nuclear power plant installations, for example.

We claim:

1. A method of measuring in real time the flowrate of fluid between a primary circuit and a secondary circuit of a steam generator, powered by a reactor of a nuclear power plant, said method comprising the following steps:

detecting at a specified point at the exterior of the secondary circuit a radioactive tracer such as isotope 16 of nitrogen ($N^{16}$) by using a device for counting particles of ionizing radiation of specified energy levels comprising means for detecting said radiation and delivering a detection signal in pulse form, on the input side of said detecting means a reference source for delivering reference ionizing radiation the energy spectrum of which is situated outside the energy spectrum of said ionizing radiation, on the output side of said detecting means means for discriminating the amplitude of said detection signal against a scale of amplitude levels and discriminating the energy spectrum of the received ionizing radiation which generated said pulses by counting the number of pulses of specified amplitude relative to the levels of the amplitude scale generated during a measurement time interval, and means of adjusting the relative position of the amplitude levels on the amplitude scale and the amplitude of the pulses generated by the reference ionizing radiation discriminated on the basis of the number of pulses of the same specified amplitude counted during the measurement time interval and calculating the leakage flowrate q between the primary circuit and the secondary circuit from the following equation:

$$q = \frac{O \cdot \rho p}{\rho v} \cdot k \cdot \frac{A}{Av}$$

in which:
$\rho p$ represents the density of the primary fluid,
Ap represents the radioactive concentration of isotope 16 of nitrogen ($N^{16}$) in the primary fluid at the leak,
O represents the steam flowrate,
$\rho v$ represents the density of the steam,
Av represents the radio active concentration in isotope 16 of nitrogen ($N^{16}$) in the steam at the measurement point, and
k represents a coefficient characteristic of the decrease in the concentration of the tracer.

2. A method according to claim 1, wherein when said reactor is operating at less than 5% of its nominal output power leakage measurement by detection of isotope 16 of nitrogen is replaced by leakage measurement by detection of the fission gas in an energy band between 0.2 and 2.2 MeV.

* * * * *

UNITED STATES PATENT AND TRADEMARK OFFICE
CERTIFICATE OF CORRECTION

PATENT NO. : 4,918,313

DATED : April 17, 1990

INVENTOR(S) : Alain Dubail et al.

It is certified that error appears in the above-identified patent and that said Letters Patent is hereby corrected as shown below:

Front page (left-hand column) should be corrected as follows:

[30]     Foreign Application Priority Data
  Jul. 10, 1986 [FR]    FRANCE           86 10088

Signed and Sealed this

Third Day of September, 1991

*Attest:*

HARRY F. MANBECK, JR.

*Attesting Officer*     *Commissioner of Patents and Trademarks*